United States Patent
Lampert et al.

(10) Patent No.: US 6,293,710 B1
(45) Date of Patent: *Sep. 25, 2001

(54) OPTICAL CONNECTOR HAVING A ONE-PIECE HOUSING

(75) Inventors: Norman Roger Lampert, Norcross; Elizabeth J. Driscoll, Atlanta, both of GA (US); John Francis May, Omaha; Jeffrey Dale Nielson, Elkhorn, both of NE (US); Naif Taleb Subh, Lawrenceville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/413,431

(22) Filed: Oct. 6, 1999

(51) Int. Cl.$^7$ ............................................. G02B 6/36
(52) U.S. Cl. ............................... 385/78; 385/76; 385/139
(58) Field of Search ................................ 385/78, 76, 139, 385/92, 53

(56) References Cited

U.S. PATENT DOCUMENTS

| | | | |
|---|---|---|---|
| 3,699,498 | 10/1972 | Hardesty et al. | 339/63 M |
| 3,761,869 | 9/1973 | Hardesty et al. | 339/99 R |
| 3,860,316 | 1/1975 | Hardesty | 339/91 R |
| 3,954,320 | 5/1976 | Hardesty | 339/99 R |
| 4,787,706 | 11/1988 | Cannon et al. | 350/96.2 |
| 4,793,683 | 12/1988 | Cannon et al. | 350/96.21 |
| 4,934,785 | 6/1990 | Mathis et al. | 350/96.21 |
| 5,212,752 | 5/1993 | Stephenson et al. | 385/78 |
| 5,481,634 | 1/1996 | Anderson et al. | 385/76 |
| 5,647,043 | 7/1997 | Anderson et al. | 385/78 |
| 5,933,558 | 8/1999 | Sauvageau et al. | 385/88 |
| 6,015,239 | 1/2000 | Moore | 385/92 |
| 6,024,498 | 12/2000 | Carlisle et al. | 385/56 |
| 6,206,581 | * 3/2001 | Driscoll et al. | 385/78 |

FOREIGN PATENT DOCUMENTS

| | | |
|---|---|---|
| 0 572 174 A2 | 12/1993 | (EP) . |
| 0 689 069 A1 | 12/1995 | (EP) . |
| 0 819 960 A2 | 1/1998 | (EP) . |

* cited by examiner

*Primary Examiner*—Frank G. Font
*Assistant Examiner*—Roy M Punnoose
(74) *Attorney, Agent, or Firm*—Thomas, Kayden, Horstemeyer & Risley, LLP

(57) ABSTRACT

The present invention provides a connector for terminating an optical fiber. The connector comprises a one-piece housing, a ferrule assembly and an insert. The insert has keys formed thereon that are adapted to mate with keyways formed in the housing. The housing has a first opening formed therein that first receives the ferrule assembly and then the insert and a second opening opposite the first opening. The end of the ferrule assembly that holds the end of the optical fiber protrudes through the second opening. The insert has a flange thereon that has two oppositely located flat surfaces and two oppositely located keys. The keys each have a chamfered surface. The keys and the flat surfaces of the flange provide the flange with a substantially rectangular cross-section. The first opening formed in the housing has a substantially square cross-section. When the insert is inserted into the first end of the housing, the substantially square cross-section of the opening aligns with the oppositely located flat surfaces of the flange to thereby cause the keys of the flange to align with the keyways formed in the surfaces of the housing. The chamfered surfaces of the keys deflect the sides of the housing outwardly as the insert is inserted into the housing. The keys of the insert are then received by the keyways formed in the housing to lock the insert into place within the housing.

20 Claims, 5 Drawing Sheets

OPTICAL CONNECTOR HAVING A ONE-PIECE HOUSING

TECHNICAL FIELD OF THE INVENTION

The present invention relates to an optical connector for use with optical fibers and, more particularly, to an optical connector for use with optical fibers that has a one-piece housing.

BACKGROUND OF THE INVENTION

Optical fiber connectors are an essential part of substantially any optical fiber communication system. For instance, such connectors may be used to join segments of fiber into longer lengths; to connect fiber to active devices such as radiation sources, optical amplifiers, detectors and repeaters; or to connect fiber to passive devices such as switches and attenuators. The central function of an optical fiber connector is the maintenance of two optical fiber ends such that the core of one of the fibers is axially aligned with the core of the other fiber; and consequently, all of the light from one fiber is coupled to the other fiber. This is a particularly challenging task because the light-carrying region (core) of an optical fiber is quite small. In singlemode optical fibers the core diameter is about 8 microns where 1 micron=1 $\mu m = 10^{-3}$ mm. Another function of the optical fiber connector is to provide mechanical stability and protection to the junction in its working environment. Achieving low insertion loss in coupling two fibers is generally a function of the alignment of the fiber ends, the width of the gap between the ends, and the optical surface condition of either or both ends. Stability and junction protection is generally a function of connector design (e.g., minimization of the different thermal expansion and mechanical movement effects). An optical fiber connector typically includes a small capillary cylinder with a glass or plastic fiber installed along its central axis. This cylinder is interchangeably referred to as a ferrule or a plug.

In a connection between a pair of optical fibers, a pair of ferrules are butted together end-to-end and light travels from one to the other along their common central axis. In this conventional optical connection, it is highly desirable for the cores of the glass fibers to be precisely aligned in order to minimize the loss of light (insertion loss) caused by the connection; but as one might expect, it is presently impossible to make routine perfect connections. Manufacturing tolerances may approach "zero," but practical considerations such as cost, and the fact that slight misalignment is tolerable, suggest that perfection in such matters may be unnecessary.

One known design of an optical fiber connector is shown in U.S. Pat. No. 4,793,683; and its basic components comprise a precision molded plastic conical plug having an optical fiber centered therein, a compression spring disposed about a cylindrical portion of the plug, and a retention collar surrounding the plug and spring. The collar includes external threads that enable it to couple with another connector via a fixture having a precision molded alignment sleeve whose shape is best described as "biconic." This design has been superseded by the connector shown in U.S. Pat. No. 4,934,785 which comprises a cylindrical plug, a base member that holds the plug, a compression spring, and a cap that surrounds the plug and spring. In this design, only the cylindrical plug needs to be of high precision and is typically made from a ceramic material. When joining two of these plugs together, an alignment sleeve is used which comprises a split, thin-walled cylinder made of metal, ceramic or even plastic material. This alignment sleeve need not be as precise as the above-described biconic alignment sleeve.

And while the above connectors perform satisfactorily, further improvements are desirable. For example, because of the growing acceptance of optical fiber as the transmission media of choice for television, data, and telephone (multimedia) communications, the need to provide higher density interconnection arrangements has emerged. All of the above-mentioned simplex optical connectors are constructed in such a way that the ability to stack a large number of them together is limited by the need to manually grasp both sides during insertion and removal from a receptacle or coupling device. Known duplex optical connectors, such as the one shown in U.S. Pat. No. 4,787,706, also require manual access to the opposite sides of its housing during removal from the receptacle or coupling device which precludes high density optical fiber interconnection arrays. Furthermore, it is always desirable to reduce cost while still providing a connector that is immediately acceptable to customers. With these latter desires in mind, reference is made to the art of electrical connectors where, perhaps, the most used and accepted connectors are the ones known as RJ11-type plugs/jacks that are typically used in corded telephone products. These connectors have achieved widespread acceptance because they are inexpensive, they operate reliably, and their operation is readily understood by customers. However, because of the high precision and low insertion loss requirements associated with optical interconnections (particularly between singlemode fibers), RJ11-type designs have been unacceptable for optical connectors. Examples of such electrical connectors are shown in U.S. Pat. Nos. 3,761,869 and 3,954,320.

Another known design of an optical fiber connector is disclosed in U.S. Pat. No. 5,212,752. The optical connector comprises a ferrule assembly that includes a ferrule portion having a passageway for an optical fiber and a plug frame in which the ferrule assembly is disposed. Once the ferrule assembly has been disposed in the plug frame, the plug frame is assembled within another portion of the optical connector called a grip. The plug frame may be assembled within the grip in a plurality of rotational orientations with respect to the grip in such a way that the direction of eccentricity is aligned with a key of the grip. Once the plug frame has been coupled within the grip, the optical connector may be inserted into a coupling housing. The coupling housing is configured to allow two identical optical connectors to be inserted therein to provide an optical connection between two optical fibers terminated by ferrule assemblies within the optical connectors.

One of the advantages of the optical connector disclosed in U.S. Pat. No. 5,212,752 is that when the plug frame is inserted within the grip, the optical connector is provided with good side-loading characteristics due to the design of the grip and the manner in which the plug frame couples with the grip. One of the disadvantages associated with this optical connector is that, once the grip is installed, it cannot be removed. This is a disadvantage if, for some reason, tuning must be re-adjusted. The coupling housing is adapted to receive the grip. Although it may be possible to insert the plug frame into the coupling housing even when the plug frame is not disposed within the grip, removing the plug frame from the coupling housing once it has been inserted would be difficult, if not impossible without a special tool, due to the fact that there is no mechanism for detaching the plug frame from the coupling housing once it has been inserted. Furthermore, if the plug frame is not disposed within the grip, the side-loading characteristics of the optical connector are diminished.

Another disadvantage of this optical connector is that it is possible for certain components of the optical connector to be improperly assembled during the assembly process. This can be seen with reference to FIG. 2 of U.S. Pat. No. 5,212,752. A cable retention member is adapted to receive a barrel and spring of the ferrule assembly during the assembly process. The cable retention member includes a collar which is chamfered such that when the cable retention member is inserted within the plug frame, the side portions of the collar are received within windows of the plug frame. However, the plug frame has a cylindrical, or annular, opening that does not include any type of keying mechanism for ensuring that the side portions of the collar are received within the windows of the plug frame. Consequently, it is possible for the cable retention member to be pressed into the plug frame in such a manner that the side portions of the collar do not align with the windows. However, even if the side portions of the collar do not align with the windows, the cable retention member will be locked into place within the plug frame via a friction fit that makes it difficult, if not impossible, for the cable retention member to be removed from the plug frame. Therefore, improper assembly of the optical connector is possible if measures are not taken to ensure proper alignment of the cable retention member with the plug frame during assembly.

The improper assembly of the cable retention member within the plug frame prevents the optical connector from having a side-loading capacity that is as great as it would be if the side portions of the collar were properly seated within the windows of the plug frame. Also, once the cable retention member has been improperly inserted into the plug frame, it is difficult, if not impossible, to properly couple the plug frame with the grip, which will make it difficult, if not impossible, to couple the optical connector to the coupling housing in order to enable the ends of two optical fibers to be optically coupled together.

Another known design of an optical connector is shown in U.S. Pat. No. 5,481,634. This connector utilizes a two-piece housing assembly comprising a housing and a cover, which are ultrasonically bonded together after a ferrule and its associated components have been installed within the housing. The associated components comprise a fiber-holding structure that includes the ferrule, a base member and a spring that is disposed about the base member. The housing is a generally U-shaped device having a cavity for receiving the fiber-holding structure. Once the fiber-holding structure has been inserted into the cavity of the housing, the cover is bonded thereto. The cover includes pins that mate with holes in the housing for alignment. Once joined together by the pins and associated holes, the front end of the connector has a generally square shape that fits into a receptacle that is shaped to receive the connector. The connector has a spring latch molded thereto that includes a living hinge, which allows a tab to be moved up and down in a direction that is generally perpendicular to the axial passageway of the fiber-holding structure. The spring latch is used for securing the connector to the receptacle in order to prevent unintended decoupling of the connector and the receptacle.

Although the optical connector disclosed in U.S. Pat. No. 5,481,634 provides several advantages over the other connectors discussed above, such as, for example, facilitating insertion into and removal from receptacles in high-density environments, and preventing or minimizing alignment variations attributable to eccentricity, a need exists for an optical connector that improves upon the design disclosed in U.S. Pat. No. 5,481,634.

As stated above, the optical connector disclosed in U.S. Pat. No. 5,481,634 utilizes a two-piece housing assembly. The two-piece housing assembly comprises a housing and a cover that are coupled together via pins and associated holes. Once coupled together, the housing and cover are ultrasonically bonded together. The task of assembling the two-piece housing assembly in an automated manufacturing process presents significant challenges. Furthermore, utilizing a two-piece housing assembly requires that steps be taken to ensure that the coupling of the pieces of the housing assembly together is done in such a manner that the assembly is provided with sufficient side-loading capability.

Optical connectors must withstand at least a certain minimum amount of side-loading in order to operate properly. As is well known in the art, when optical fibers are bent beyond a particular bending radius, signal loss occurs. Therefore, an optical connector needs sufficient side-loading capability in order to prevent the optical fibers housed therein from being bent beyond an allowable bending radius. Although the optical connector disclosed in U.S. Pat. No. 5,481,634 provides adequate side-loading capability, ensuring that the optical connector is provided with adequate side-loading capability presents certain difficulties in the manufacturing process due to the fact that a two-piece housing assembly tends to be susceptible to side-loading problems at the locations where the pieces of the housing are coupled together.

Another popular design of an optical fiber connector is shown in FIG. 1. This connector 1 utilizes a two-piece housing assembly comprising a front plug body 2 and a rear extender cap 3 that has a metal insert-molded strength member (not shown). The plug body 2 has keyways 5-5 formed in opposite sides thereof. The rear extender cap 3 has keys 4-4 disposed on opposite sides thereof. The plug body 2 is coupled to the extender cap 3 by snapping the keys 4-4 located on each side of the plug body 2 inside of the keyways 5-5 formed in each side of the extender cap 3.

Although this optical connector provides several advantages over the other connectors discussed above, such as, for example, providing a substantially preassembled connector plug for installation on jumper cordage, a need exists for an optical connector that improves upon this connector design. The junction 6 where the plug body 2 and the extender cap 3 meet is susceptible to side-loading or side-pulling forces, which, as stated above, can cause the optical performance associated with the connector to deteriorate. There is a need to be able to increase the side-loads on the connector 1. However, doing so can cause the junction 6 to be flexed to unacceptable levels. It would be desirable to provide a connector that would not be flexed to unacceptable levels under increased side-loading conditions.

Accordingly, a need exists for an optical connector that has desirable side-loading characteristics, that is relatively easy to manufacture and assemble, and that is suitable for use in high-density applications where many optical connectors may need to be inserted into receptacles that are relatively close to one another in spatial proximity.

SUMMARY OF THE INVENTION

The present invention provides a connector for terminating an optical fiber. The connector comprises a one-piece housing, a ferrule assembly and an insert. The insert has a keying mechanism formed thereon that is adapted to mate with a keying mechanism formed in the housing. The housing has a first opening formed therein that receives the ferrule assembly and the insert and a second opening opposite the first opening. The end of the ferrule assembly that holds an end of an optical fiber protrudes through the second opening. During assembly of the connector, the ferrule assembly is inserted into the housing and then the insert is inserted into the housing and secured to the housing to thereby secure the ferrule assembly within the housing and prevent the ferrule assembly and the insert from being inadvertently decoupled from the housing. The keying mechanisms of the insert and of the housing secure the insert to the housing.

In accordance with the preferred embodiment of the present invention, the insert has a flange thereon that has two oppositely located flat surfaces and two oppositely located keys. The keys of the insert form the locking mechanism of the insert. The keys each have a chamfered surface. The keys and the flat surfaces of the flange provide the flange with a substantially rectangular cross-section. The first opening formed in the housing preferably has a substantially square cross-section. When the insert is inserted into the first end of the housing, the substantially square cross-section of the opening aligns with the oppositely located flat surfaces of the flange to thereby cause the keys of the flange to align with keyways formed in the surfaces of the housing. The keyways of the housing correspond to the locking mechanism of the housing.

The flange is slightly larger in size than the size of the first opening of the housing. Therefore, as the insert is inserted into the first opening of the housing, the chamfered surfaces of the keys deflect the sides of the housing outwardly. The keys of the insert are then received by the keyways formed in the housing to lock the insert into place within the housing. Once the keys have been received within the keyways, the major stress on the housing is relieved. The housing has slots formed in two opposing surfaces thereof, which are transverse to the surfaces of the housing in which the keyways are formed. The slots allow the housing to deflect outwardly as the insert is inserted into the housing.

These and other features and advantages of the present invention will become apparent from the following description, drawings and claims.

DETAILED DESCRIPTION OF THE INVENTION

Figure 1:
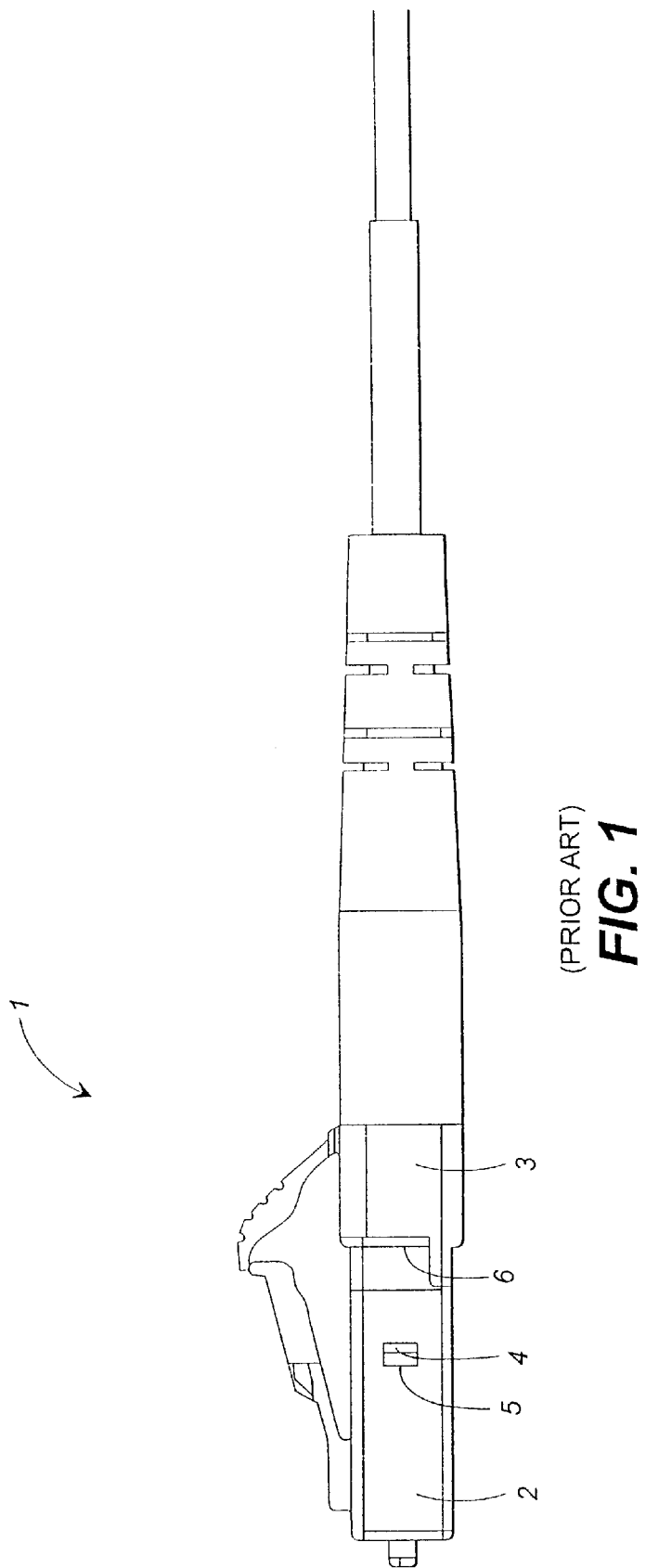
FIG. 1 is a side plan view of a known design of an optical connector.
Figure 2:
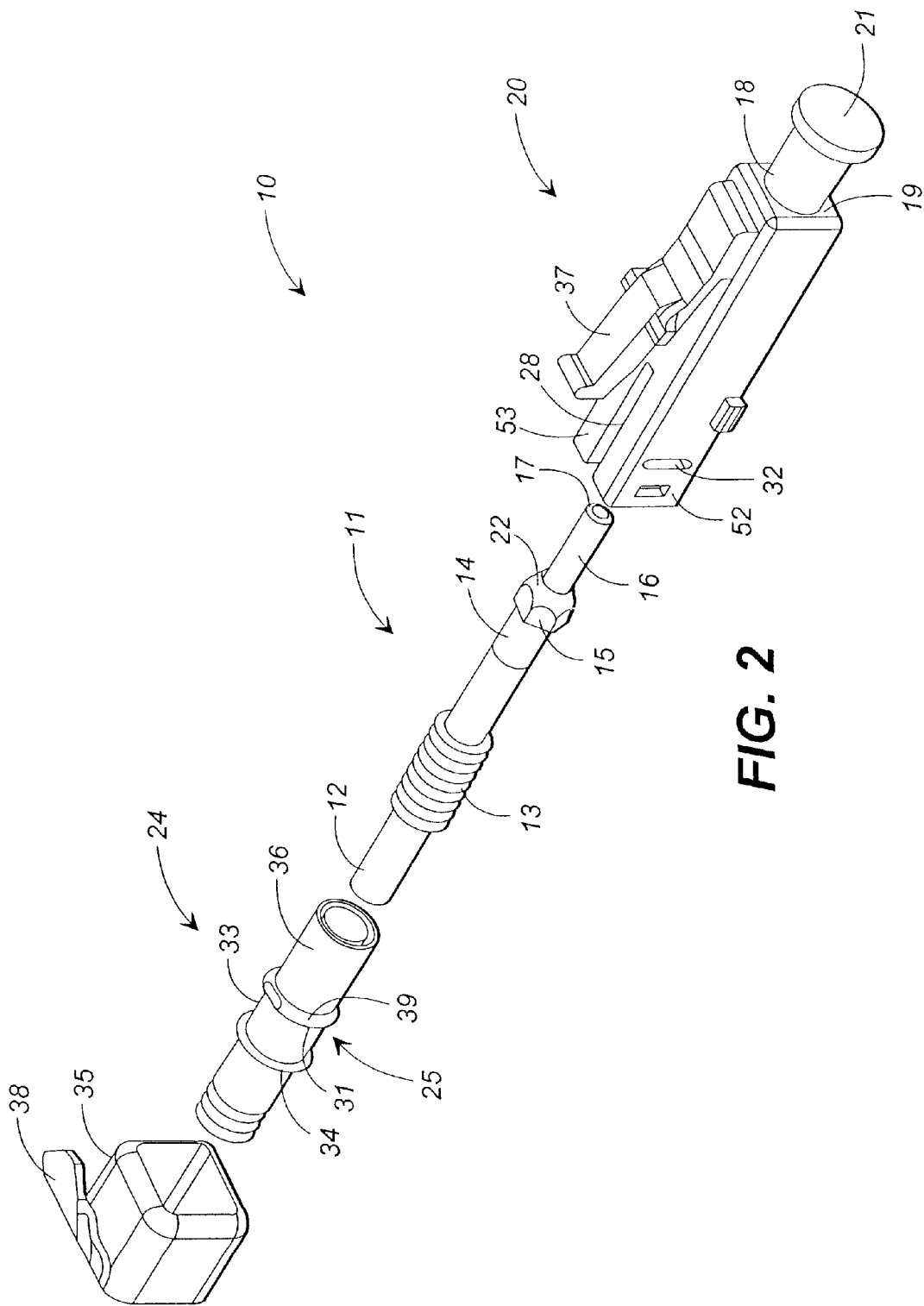
FIG. 2 is a perspective view of the components of the optical connector of the present invention having a protective cover thereon, which is shown prior to assembly of the optical connector.

FIG. 2 is a perspective view of the optical connector of the present invention in accordance with the preferred embodiment. The optical connector 10 comprises a one-piece housing 20 that is designed to receive a ferrule assembly 11. The ferrule assembly 11 comprises a flexible tube 12 through which an optical fiber (not shown) passes, a stainless steel barrel 14 having a hexagonally-shaped tuning portion 15 disposed on an end thereof, and a ferrule 16. The flexible tube 12 preferably is comprised of Teflon® fluorinated ethylene propylene, which is a material marketed by Dupont. When the ferrule assembly 11 is disposed within the one-piece housing 20, the ferrule 16 protrudes through an opening 18 formed in a forward end 19 of the one-piece housing 20. The opening 18 is adapted to allow a protective cover 21 to be removably attached thereto, which covers and protects the ferrule 16. Therefore, the cover 21 is not comprised by the one-piece housing 20. The cover 21 is not a necessary element of the optical connector 10.

The tuning portion 15 preferably is integrally formed on a forward end of the barrel 14. The ferrule 16 is press fit within the tuning portion 15 to prevent movement of the ferrule 16 with respect to the tuning portion 15 and the barrel 14. One function of the barrel 14 of the ferrule assembly 11 is that it provides an interior surface for attachment of the fiber buffer (not shown). During assembly, an adhesive, such as epoxy, for example, is inserted into the barrel 14 by means of a syringe. The optical fiber having the buffer thereon passes through the tube 12. The buffer is then adhered to the barrel 14 by the adhesive. The barrel 14 has a tapered end (not shown) that is press fit into an end of the tube 12. This press fit prevents movement of the barrel 14 with respect to the tube 12. The ferrule 16 has a narrow passageway through its central axis for receiving an end portion of an optical fiber (not shown).

A compression spring 13 of the optical connector 10 is disposed about the tube 12 and enables the ferrule 16 of the ferrule assembly 11 to be moved back and forth in the axial direction of the ferrule 16 within the opening 18. An end face 17 of the ferrule 16 comprises a polished surface that abuts an end face of another ferrule (not shown) when the optical connector 10 is disposed in an adapter (not shown) that optically couples the optical fiber disposed within the ferrule 16 with another optical fiber (not shown) of another optical connector (not shown) that is also disposed within the adapter. Alternatively, the ferrule end face 17 can abut a device stop (not shown) in a device receptacle (not shown), as will be understood by those skilled in the art.

When the ferrule assembly 11 is disposed within the one-piece housing 20, the tuning portion 15 is seated within a recess formed in the housing 20. The recess has a hexagonal shape, or cross-section, with dimensions designed to receive the hexagonally-shaped tuning portion 15 and prevent it from rotating. The recess will be discussed in more detail below with reference to FIG. 5. As stated above, the tuning portion 15 is securely attached to the ferrule 16, thereby preventing relative movement between the tuning portion 15 and the ferrule 16.

The tuning portion 15 has slots 22 formed in opposite sides thereof that are adapted to receive a tool (not shown) that is used for tuning the eccentricity associated with the optical fiber and the ferrule 16. Only one of the openings 22 can be seen in FIG. 2. The eccentricity may be tuned after the ferrule assembly 11 has been disposed within the one-piece housing 20, i.e., after the optical connector 10 has been assembled. In order to tune the eccentricity after the optical connector 10 has been assembled, a tool (not shown) is inserted through the opening 18 formed in the forward end 19 of the one-piece housing and into the openings 22 formed in opposite sides of the tuning portion 15. The tool is then pushed inwards, causing the tuning portion 15 to be pushed against the spring 13 and lifted out of the hexagonally-shaped recess of the housing 20. While the tuning portion 15 is disposed outside of the hexagonally-shaped recess of the housing 20, the tool may be used to provide a rotational force to the tuning portion 15 that causes the tuning portion 15, and the ferrule 16 attached thereto, to rotate. When the tool is removed from the opening 22, the spring 13 forces the tuning portion 15 back into the hexagonally-shaped recess, which prevents the tuning portion 15, and the ferrule 16 that is attached thereto, from rotating. The tuning portion 15 preferably has six sides to enable the tuning portion to be oriented within the hexagonally-shaped recess in six different rotational orientations.

Once the ferrule assembly 11 and the spring 13 disposed about the ferrule assembly 11 have been placed in the one-piece housing 20, an insert 24 that has an inner diameter that is slightly larger than the outer diameter of the tube 12 is inserted over the back end of the tube 12 and placed in contact with an end of the compression spring 13. The insert 24 acts as a strength member and holds the ferrule assembly 11 in place within the one-piece housing 20, while also enhancing the side-loading capacity of the optical connector 10. The insert 24 has a flange 25 and a stop 34 disposed thereon. The flange 25 is comprised of two oppositely located flat sides 33-33 and two oppositely located chamfered, or beveled, surfaces 39-39, which provide the flange 25 with a substantially rectangular-shaped cross-section. Only one of the flat sides 33 and one of the chamfered surfaces can be seen in FIG. 2.

Figure 3A:
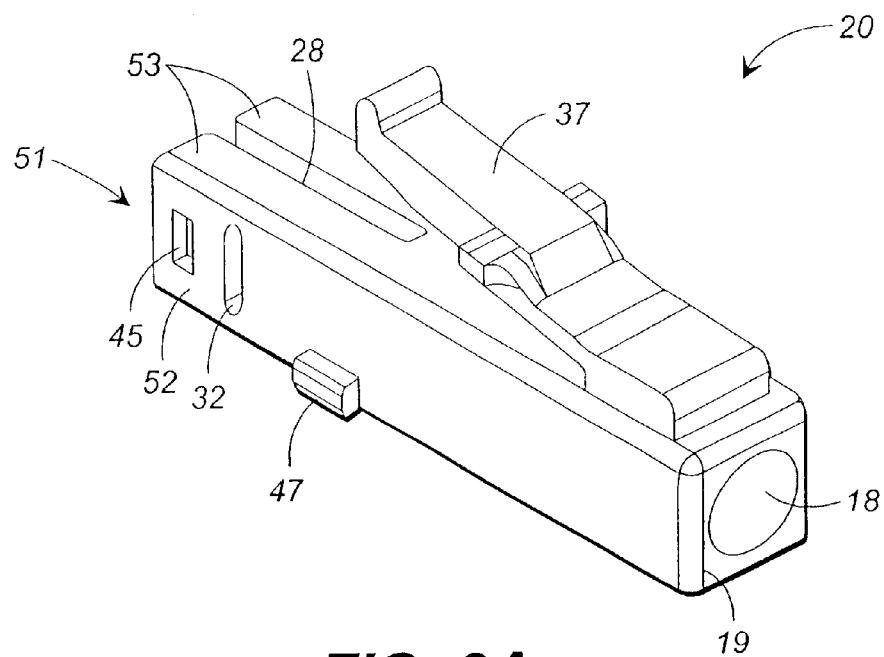
FIG. 3A is a top, perspective view of the one-piece housing of the optical connector of the present invention shown in FIG. 2.
Figure 3B:
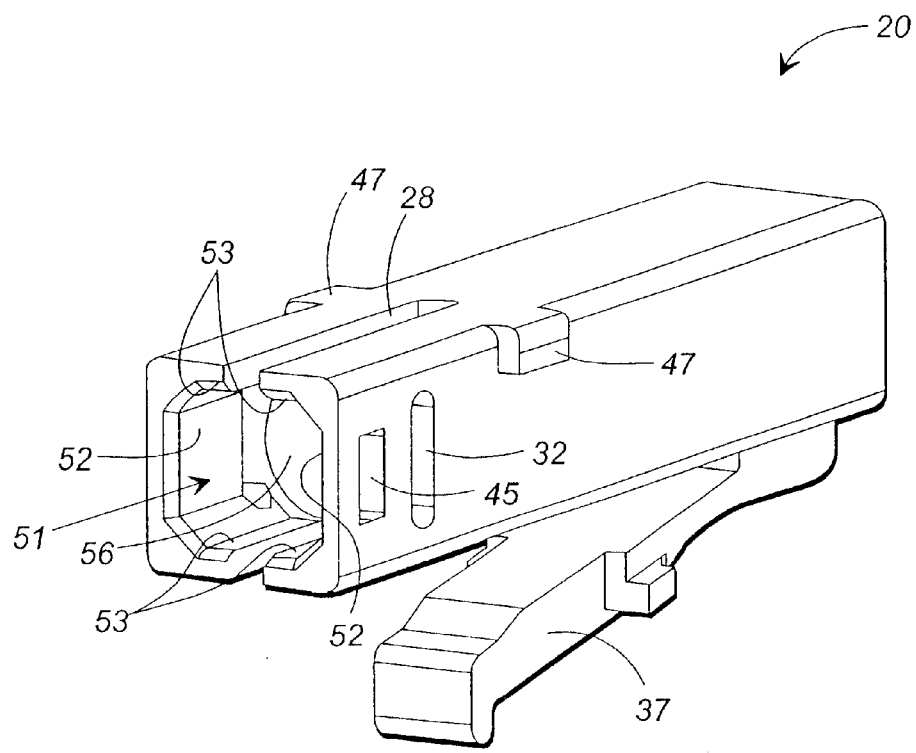
FIG. 3B is a bottom, perspective view of the one-piece housing of the optical connector of the present invention shown in FIG. 2.

FIGS. 3A and 3B illustrate top and bottom perspective views, respectively, of the one piece housing 20 of the optical connector 10 of the present invention shown in FIG. 2. The one-piece housing 20 has a substantially square-shaped opening 51 defined by side surfaces 52-52 and top and bottom surfaces 53-53 at the back end of the housing 20. The substantially square opening 51 formed in the back end of the one-piece housing 20 is followed in the housing 20 by an annular cylindrical portion that is slightly larger than the cylindrical portion 36 of the insert 24. The portion 36 of the insert 24 enters the opening 51 formed by the surfaces 52-52 and 53-53 at the back end of the housing 20 and the chamfered surfaces 39-39 of the keys 31-31 push the surfaces 52-52 outwards causing the back end of the one-piece housing 20 to be flexed outwardly. The keys 31-31 are guided in the proper orientation by the flat surfaces 33-33 of the flange 25. Identical slots 28 located in the top and bottom surfaces of the one-piece housing 20 allow the one-piece housing 20 to flex outwardly to accommodate the keys 31-31 of the flange 25.

The opening 51 in the back end of the one-piece housing 20 allows the insert 24 to be pressed therein in two different orientations, which are 180° apart from one another. This feature of the present invention is extremely advantageous during assembly of the optical connector because it allows the insert 24 to be quickly aligned with the opening in the back end of the one-piece housing 20. As the insert 24 is pressed into the housing 20, the square shape of the opening formed in the housing 20 causes the keys 31-31 of the flange 25 to line up with keyways 32-32 formed in the side walls 52-52 of the housing 20, thereby ensuring proper alignment of the insert 24 and the housing 20. Once the insert 24 has been pressed into the one-piece housing 20, the keys 31-31 are received in keyways 32-32 and the major stress is relieved in the housing 20. The mating of the keys 31-31 of the flange 25 with the keyways 32-32 of the one-piece housing 20 locks the insert 24 in place within the one-piece housing 20 and prevents the ferrule assembly 11 and the insert 24 from inadvertently being decoupled from the one-piece housing 20.

Once the insert 24 has been assembled over the ferrule assembly 11 and has been locked into place within the one-piece housing 20, a yoke 35 may be placed over the back end of the one-piece housing as shown. Slots 45 formed in opposite sides of the one-piece housing 20 mate with projections (not shown) formed on the yoke 35 to enable the yoke 35 or an end cap (not shown) to be securely attached to the one-piece housing 20. The one-piece housing 20 has a "living" latch 37 located thereon that comes into contact with a trigger 38 disposed on the yoke 35. When the optical connector 10 is placed in an adapter (not shown) for optically coupling light from two optical fibers together, the latch 37 functions to lock the optical connector in place within the adapter. The optical connector 10 may be removed from the adapter by depressing the trigger 38 of the yoke 35, which causes the latch 37 to be pressed in a downward and forward direction, thereby unlocking the optical connector 10 from the adapter.

Stops 47 located on each side of the one-piece housing 20 abut the front end of the yoke 35 when the yoke 35 is inserted over the back end of the one-piece housing 20 and is locked into place. It should be noted that the yoke 35 is not a necessary component of the optical connector 10, but may be added for convenience in order to enable a user to easily decouple the optical connector 10 from an adapter. As will be understood by those skilled in the art, the trigger may be molded onto the housing 20 such that it is an integral part of the housing 20. Even in the absence of a yoke having a trigger or a trigger formed on the housing 20, the optical connector 10 can be decoupled from an adapter by the user simply using his or her fingernail to depress the latch 37. Alternatively, an end cap (not shown) may be placed over the end of the housing 20 rather than the yoke 35, or the end of the housing 20 may have nothing attached to it other than the insert 24.

FIG. 3B illustrates the opening 51 formed in the back end of the one-piece housing 20. As stated above, the opening 51 is slightly smaller in size than the major diameter of the keys 31-31 of the flange 25 such that, when the insert 24 is inserted into the housing 20, the tapered surfaces 39-39 of the keys 31-31 of the flange 25 force the sides of the housing outwards. Also, the opening 51 has a substantially square cross-section so that the opening 51 will be guided by surfaces 33-33 of the flange 25 in such a manner that the keys 31-31 of the flange 25 are aligned to be received within the keyways 32-32 formed in the sides of the housing 20.

During an automated assembly process, many optical connectors are assembled in rapid succession. When the inserts 24 are aligned for assembly by a vibratory feeder (not shown), the inserts 24 can be suspended by their stops 34 and point downwards on a track that accepts the diameter 36 of the insert 24 and aligns on flat surfaces 33-33. The inserts 24 are then placed within the openings 51 and aligned with the openings 51. When the insert 24 is pressed into the opening 51, the substantially square cross-section of the opening 51 formed by the surfaces 52-52 and 53-53 will cause the flat surfaces 33-33 of the keys 31-31 of the flange 25 to align with the keyways 32-32.

Figure 4A:
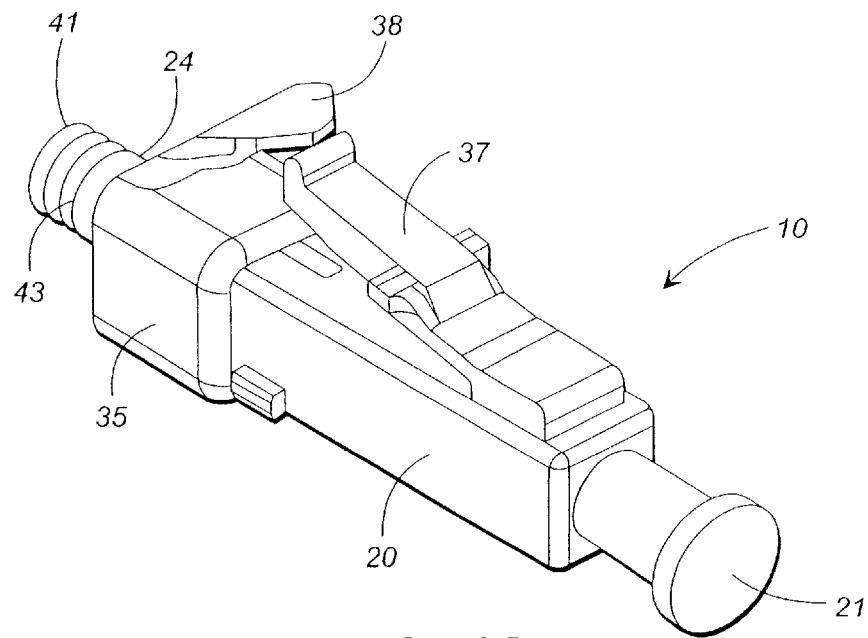
FIG. 4A is a perspective view of the optical connector of the present invention shown in FIG. 2 after the components of the optical connector have been assembled.

Once the optical connector 10 has been assembled, the optical connector 10 has the appearance shown in FIG. 4A. The optical connector 10 shown in FIG. 4A is shown as having the yoke 35 attach thereto. An end 41 of the insert 24 is adapted to have strength members, such as, for example, aramid fibers, of an optical fiber cable attach thereto. The strength members are attached by, for example, a crimping device (not shown) to a circumferential groove 43 formed in the end 41 of the insert 24. The crimping device may be a crimping sleeve of the type commonly used for attaching strength members to optical connectors. The manner in which the strength members of an optical fiber cable may be secured to the insert 24 is well known to those skilled in the art. Attachment of the strength members to the insert 24 causes forces applied to the optical fiber cable to be distributed via the strength members to the insert 24, thereby preventing the forces from being applied directly to the optical fiber.

Figure 4B:
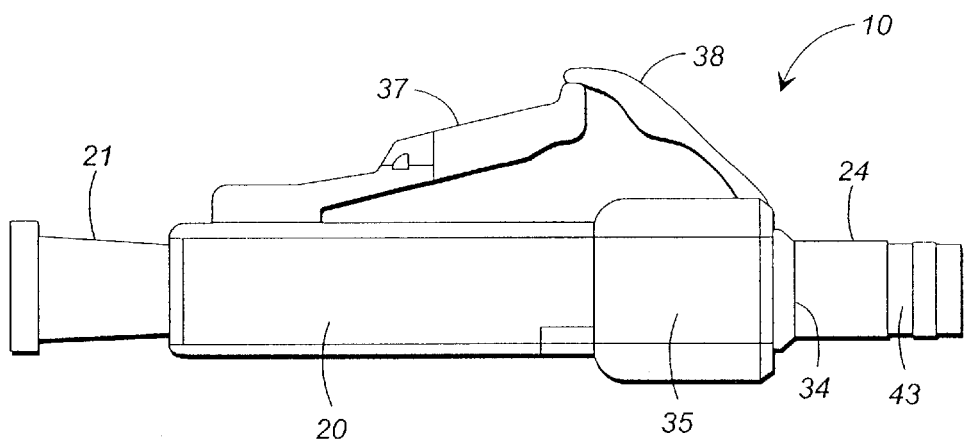
FIG. 4B is a side, plan view of the optical connector of the present invention shown in FIG. 2 after the components of the optical connector have been assembled.

FIG. 4B is a side, plan view of the optical connector 10. Again, the optical connector 10 of the present invention is shown as having the yoke 35 attached thereto merely for illustrative purposes. FIG. 4B illustrates the preferred dimensions of the one-piece housing 20 of the present invention. Although the one-piece housing 20 of the present invention is not limited to any particular dimensions, the length of the one-piece housing 20 preferably is selected to assist in the side-loading capability of the one-piece housing 20. Preferably, the one-piece housing 20 is 0.775 inches, or 19.68 millimeters (mm), in length.

A stop 34 disposed on the insert 24 behind the flange 25 is larger in diameter than the opening formed in the back end of the one-piece housing 20. The stop 34 abuts the back end of the one-piece housing 20 when the insert 24 is fully inserted into the one-piece housing 20 and the keys 31-31 are engaged in the keyways 32-32. The mating of the keys 31-31 of the flange 25 within the keyways 32-32 of the one-piece housing 20 prevents the insert 24 from rotating once the insert 24 has been locked into place within the one-piece housing 20. This assists in minimizing twisting of the strength members attached to the circumferential groove 43 of the insert 24, which, in turn, assists in preventing the optical fiber of the optical fiber cable from twisting.

Figure 5:
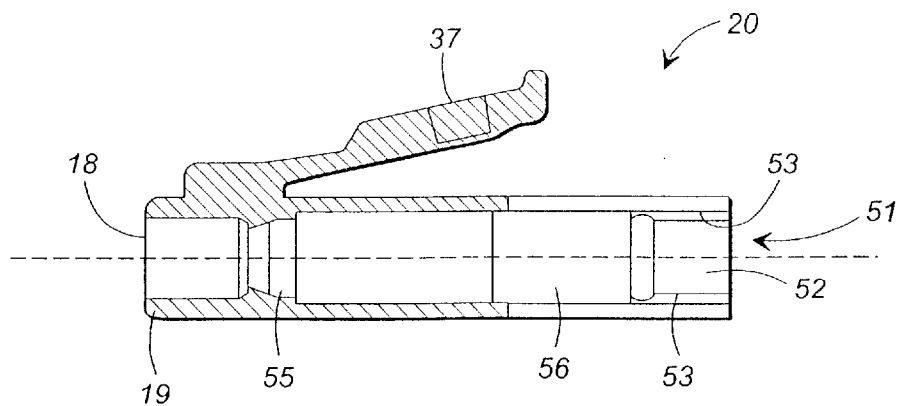
FIG. 5 is a side, cross-sectional view of the one-piece housing of the optical connector of the present invention shown in FIGS. 2–3B.

FIG. 5 is a side, cross-sectional view of the one-piece housing 20 of the optical connector 10 of the present invention. The view shown in FIG. 5 shows the hexagonally-shaped recess 55 defined within the housing 20. FIG. 5 also shows the annular cylindrical portion 56 of the housing 20 that follows the opening 51 formed in the end of the housing 20. As stated above, this portion receives the cylindrical portion 36 of the insert 24. The tuning portion 15 of the ferrule assembly 11 shown in FIG. 2 is seated within the hexagonally-shaped recess 55 when the ferrule assembly 11 is disposed within the housing 20. An end of the spring 13 of the ferrule assembly 11 abuts the tuning portion 15 and is disposed adjacent the hexagonally-shaped recess 55. As stated above, the tuning portion 15 enables the eccentricity of the optical fiber to be tuned after the optical connector 10 has been assembled. Those skilled in the art will understand that other techniques and devices for tuning the eccentricity of the optical fiber may be used with the optical connector 10 of the present invention. However, it should be noted that the tuning portion 15 is not a necessary component of the optical connector 10 of the present invention.

Eccentricity is defined as the distance between the centroidal axis of the ferrule at an end face of the ferrule and the centroidal axis of the optical fiber core held within the passageway of the ferrule. Generally, the passageway is not concentric with the outer cylindrical surface of the ferrule, which is the reference surface. Also, the optical fiber may not be centered within the ferrule passageway and the fiber core may not be concentric with the outer surface of the fiber. Hence, the eccentricity is comprised of the eccentricity of the optical fiber within the ferrule passageway and the eccentricity of the passageway within the ferrule. The eccentricity can be tuned by rotating the tuning portion 15 to a rotational orientation that provides the best optical coupling of the optical fiber cores. The hexagonally-shaped tuning portion 15 and the hexagonally-shaped recess 55 formed in the housing 20 allow the ferrule 16 to be placed in any one of six different rotational orientations in order to tune the eccentricity of the optical fiber core with reference to the ferrule 16. Since the eccentricity can be tuned after the optical connector 10 has been assembled, it is not necessary to disassemble the optical connector in order to change the eccentricity.

However, it should be noted that the optical connector 10 may instead utilize a ferrule assembly that is tuned for eccentricity prior to assembly of the optical connector. Those skilled in the art will understand that a variety of ferrule assemblies are suitable for this purpose. Therefore, those skilled in the art will understand that the present invention is not limited to using the ferrule assembly 11 shown in FIG. 2. An example of a ferrule assembly other than that shown in FIG. 2 that is suitable for use with the optical connector of the present invention is disclosed in U.S. Pat. No. 5,481,634, which is commonly assigned to the assignee of the present application, and which is incorporated by reference herein in its entirety. Those skilled in the art will also understand that the present invention applies to untuned connectors as well.

Figure 6:
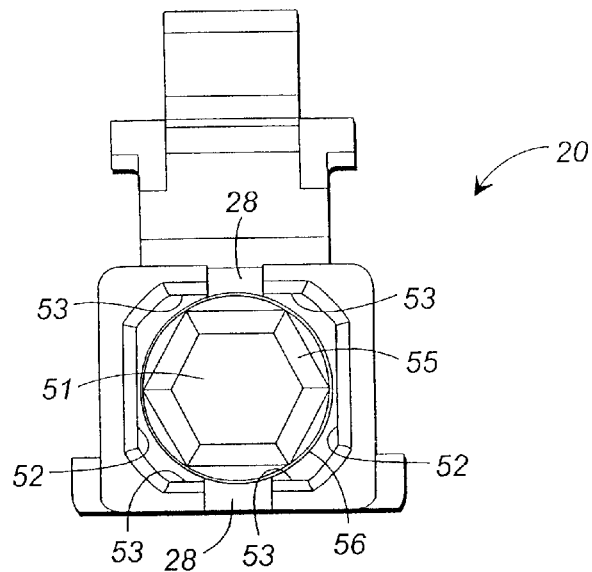
FIG. 6 is a rear, plan view of the one-piece housing of the optical connector of the present invention shown in FIGS. 2–3B.

FIG. 6 is a rear view of the one-piece housing 20 of the present invention. The hexagonally-shaped recess 55 defined within the housing 20 can be seen from the rear view shown in FIG. 6. The view shown in FIG. 6 also shows the slots 28 formed in the top and bottom surfaces of the housing 20, the side surfaces 52-52 that define the sides of the opening 51, and the top and bottom surfaces 53-53 that define the top and bottom sides of the opening 51. As stated above, the opening 51 defined by the surfaces 52-52 and 53-53 at the back end of the housing 20 is forced open by the keys 31-31 such that when the insert 24 is pressed into the housing, the flange 25 pushes the sides 52-52 of the housing 20 in an outward direction. The slots 28 enable the sides 52-52 of the housing 20 to deflect outwardly. During insertion of the insert 24 and just prior to the keys 31-31 of the flange 25 being received within the keyways 32-32 of the housing 20, the housing 20 is at a maximum degree of deflection. When the keys 31-31 are positioned in the keyways 32-32, the housing 20 is in an ideal, substantially low-stress condition.

The insert 24 functions as a strength member and the combination of the insert 24 and the manner in which it couples with the housing 20 provides the optical connector 10 with optimum side-loading capability. The length of the slots 28 formed in the housing 20 have been selected to provide the housing 20 with a degree of outward deflection that is within acceptable load, or stress, limits. Preferably, the length of the slots is 0.290 inches, or 7.37 mm. Preferably, the width of the slots is 0.035 inches, or 0.89 mm. However, those skilled in the art will understand that the one-piece housing 20 of the present invention is not limited with respect to the dimensions of various features thereof, including those of the slots 28.

The tight coupling of the insert 24 with the housing 20 is a result of (1) the sliding fit of the cylindrical portion 36 of the insert 24 within the cylindrical portion 56 of the housing 20, (2) the containment of a substantial portion of the insert 24 within the housing 20, (3) the positioning of the stop 34 against the back end of the housing 20 when the keys 31-31 are locked within the keyways 32-32, and (4) the locking of the keys 31-31 within the keyways 32-32. The combination of these features provides the optical connector 10 with very good side-loading capability. Also, the strength of the insert 24 further enhances the side-loading capability of the optical connector 10. The insert 24 preferably is comprised of a metal material. Preferably, the insert 24 is comprised of aluminum, a nickel-plated brass alloy, or stainless steel. However, other materials are suitable for this purpose, as will be understood by those skilled in the art.

The insert 24 and the various structural features thereof must be capable of withstanding the loads and stresses that will be encountered by the insert 24. The insert 24 will encounter various loads and stresses in performing its functions. For example, when the insert 24 is inserted into the back end of the one-piece housing 20, the insert 24 will be stressed as it causes the sides of the housing 20 to flex outwardly. Once the insert 24 has been secured within the housing 20, bending stresses resulting from the outwardly flexed walls of the housing 20 will be removed. However, stresses will be applied to the insert 24 and to the housing 20 when forces are applied to the optical fiber cable attached by strength members to the insert 24, as well as when forces are applied directly to the insert 24 or to the housing 20. Therefore, the insert 24 should be designed of a material that is suitable for handling the expected stresses and loads.

Figure 7A:
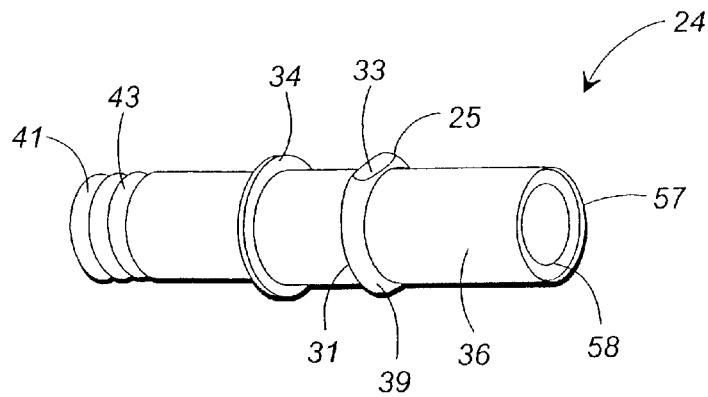
FIG. 7A is a side, perspective view of the insert of the optical connector of the present invention shown in FIG. 2 prior to assembly of the components of the optical connector.
Figure 7B:
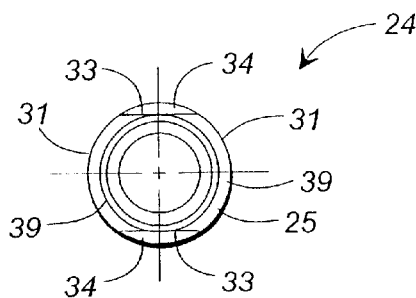
FIG. 7B is a front, plan view of the insert shown in FIG. 7A.

FIGS. 7A and 7B illustrate a side, perspective view and a front, plan view, respectively, of the insert 24. The insert 24 has a leading end with a circumferential ridge 57 and a circumferential ledge 58 that come into contact with and align the spring 13 when the insert 24 is pressed against the spring 13 inside of the housing 20 in order to preload the spring 13. The keys 31-31 of the flange 25 have a diameter that is substantially identical to the diameter of the stop 34 located behind the flange 25. This can be clearly seen from the front, plan view shown in FIG. 6B. The stop 34 is larger than the opening 51 formed in the back end of the one-piece housing 20. The top and bottom flat surfaces 33-33 of the keys 31-31 of the flange 25 reduce the dimensions of the flange 25 in the vertical directions to a diameter that is equal to the diameter of the stop 34. When the keys 31-31 of the flange 25 are received within the keyways 32-32 of the housing 20, the stop 34, which is larger in diameter than the size of the opening 51, abuts against the back end of the housing 20.

Another advantageous feature of the present invention is that the design of the optical connector 10 eliminates the need to use insert molding. In the past, optical connectors have been fabricated by using insert molding to mold the plastic of the optical connector about the metal tube, or insert, to which the strength members (e.g., aramid fibers) are normally attached. Insert molding results in a portion of the optical connector encapsulating a portion of the metal tube, which prevents movement of the metal tube with respect to the housing. In accordance with the present invention, insert molding is not needed because when the keys 31-31 of the flange 25 are seated within the keyways 32-32 of the one-piece housing 20, the insert 24 is locked into position within the housing. This feature of the present invention facilitates the process of fabricating and assembling the optical connector 10 of the present invention because insert molding is not required to fixedly attach the insert 24 to the housing 20.

Preferably, the housing 20 of the optical connector 10 of the present invention is comprised of a polymer known as polyphenylsulfone. BP-Amoco Polymers, Inc. sells a brand of polyphenylsulfone known as RADEL® R, which is the preferred type of polyphenylsulfone utilized for the one-piece housing 20 of the present invention. In accordance with the present invention, it has been determined that this particular polymer has properties that make it desirable for use as the one-piece housing 20 of the present invention. RADEL® R polyphenylsulfone has several characteristics that make it suitable for use with the present invention including (1) good flexibility, which enhances the life of the living hinge 37, (2) low sensitivity to molding parameters, which reduces the possibility that variations in the mold temperature and other mold process parameters will result in defects in the housing 20, and (3) compatibility with anaerobic adhesives that are often used to attach the optical fiber to the ferrule in private networks such as, for example, campus wiring.

However, other types of materials are also suitable for use in fabricating the one-piece housing 20 of the present invention. For example, a material manufactured by General Electric Company known as Polyetherimide Resin and marketed under the tradename ULTEM® is also a suitable material for the housing 20. Therefore, those skilled in the art will understand that the optical connector 10 of the present invention is not limited with respect to the material of which it is comprised.

In the past, polyetherimide, which is commonly referred to as PEI, has been a popular material used for fabricating optical connectors. This is because PEI has many desirable properties, such as, for example, compatibility with anaerobic adhesives, flexibility and strength, and relative low cost. RADEL® R polyphenylsulfone is even more flexible than PEI and is similar in flexibility to polycarbonate. However, RADEL® R polyphenylsulfone has more desirable chemical properties than either polycarbonate or PEI. Through experimentation, it has been determined that the living hinge 37 of the optical connector 10 of the present invention will have a longer life when the housing 20 is comprised of RADEL® R polyphenylsulfone than it will if the housing 20 is comprised of PEI. This is due to the fact that RADEL® R polyphenylsulfone has greater flexibility than PEI. RADEL® R polyphenylsulfone, however, is only about 66% as strong as PEI.

On the other hand, since PEI is less flexible, but stronger, than RADEL® R polyphenylsulfone, optical connectors comprised of PEI generally can be expected to have better side-loading capability than identical connectors comprised of RADEL® R polyphenylsulfone. However, since the optical connector 10 of the present invention comprises a one-piece housing, which provides it with greater side-loading capability than that associated with prior art optical connectors having two-piece housing assemblies, it has been determined that the housing 20 of the present invention may be comprised of more flexible materials, such as, for example, RADEL® R polyphenylsulfone, without sacrificing side-loading capability. The ability to use more flexible materials for the housing of the optical connector provides several advantages, including the ability to create an optical connector having a latch that has a longer life expectancy than latches utilized with other types of optical connectors.

It should be noted that the present invention has been described with respect to the preferred embodiments and that the present invention is not limited with respect to these embodiments. Those skilled in the art will understand that modifications can be made to the embodiments discussed above, which are within the scope of the present invention. For example, modifications may be made to the one-piece housing 20 and to the insert 24 that are within the scope of the present invention. For example, although the slots 28 formed in the housing 20 preferably are located on the top and bottom surfaces of the housing 20, the slots 28 could, alternatively, be located on the surfaces of the housing 20 in which the keyways 32-32 are shown as being located. In this case, the keyways 32-32 would be located on the top and bottom surfaces of the housing 20, rather than on the sides of the housing 20. As the insert 24 is inserted into the housing 20, the housing 20 will flex in the vertical directions and the slots located on the sides of the housing 20 will allow it to do so.

It should be noted that only one slot 28 is necessary to provide the housing 20 with the ability to flex outwardly as the insert 24 is inserted therein. However, preferably two slots 28 are used for this purpose. Furthermore, the slots 28 may be eliminated altogether if the housing material has sufficient flexibility. It should also be noted that only one key 31 and one associated keyway 32 are needed to enable the insert 24 to be interlocked with the housing 20, although two keys 31-31 and two corresponding keyways 32-32 preferably are used for this purpose.

It should also be noted that keying mechanisms other than the keys 31-31 and keyways 32-32 may be used to lock the insert 24 to the housing 20. Those skilled in the art will understand that many different types of keying mechanisms are suitable for this purpose. It should also be noted that, although the keys are shown as being located on the insert 24 and the keyways are shown as being located on the housing 20, the keyways could be located on the insert 24 and the keys could be located on the housing 20. Those skilled in the art will understand how such modifications may be made to the optical connector of the present invention. Those skilled in the art will understand that other modifications may be made to the embodiments discussed above and that all such modifications are within the scope of the present invention.

What is claimed is:

1. A connector for terminating an optical fiber, the connector comprising:

a ferrule assembly, the ferrule assembly having a first end, a second end and an axial passageway extending from the first end to the second end, the second end of the ferrule assembly adapted to maintain an end of an optical fiber in a substantially fixed position with respect to the second end of the ferrule assembly, the optical fiber passing through the axial passageway of the ferrule assembly;

a housing having internal surfaces that define a cavity adapted to receive the ferrule assembly, the housing including a first opening for receiving the ferrule assembly having the optical fiber disposed therein and a second opening through which the second end of the ferrule assembly protrudes, the first and second openings of the housing being located at opposite ends of the housing, the first opening in the housing having a substantially square shape, the housing having at least a first slot formed in a first surface thereof, the first slot extending from the first opening a predetermined distance in a direction from the first opening toward the second opening, the predetermined distance corresponding to a length of the slot, the slot enabling the housing to be flexed outwardly in directions transverse to the length-wise direction of the slot, the housing comprising a keying mechanism; and an insert having a first opening formed in a first end thereof, a second opening formed in a second end thereof, and a passageway for allowing an optical fiber to pass through the insert, the second end of the insert adapted to engage the first end of the ferrule assembly, the insert comprising a keying mechanism, the insert being adapted to be secured to the housing by pressing the insert into the housing until the keying mechanism of the insert interlocks with the keying mechanism of the housing, the insert securing the ferrule assembly within the housing and preventing the ferrule assembly from being inadvertently removed from the housing when the second end of the insert is engaged with the first end of the ferrule assembly and the keying mechanism of the insert is interlocked with the keying mechanism of the housing.

2. The optical connector of claim 1, wherein the housing has a second slot formed in a second surface thereof, the second slot extending from the first opening a predetermined distance in a direction from the first opening toward the second opening, the predetermined distance corresponding to a length of the second slot, the slots enabling the housing to be flexed outwardly in directions transverse to the lengthwise directions of the slots.

3. The connector of claim 2, wherein the keying mechanism of the insert comprises a flange integrally formed about the insert, the flange having a substantially rectangular cross-section, the flange comprising two oppositely located flat sides and two oppositely located keys, the keys corresponding to the keying mechanism of the insert, each of the keys having a chamfered surface, each key being separated from the other key by one of the flat sides of the flange, the keys and flat surfaces forming a configuration that defines the substantially rectangular cross-section, and wherein the keying mechanism of the housing comprises first and second keyways formed in first and second surfaces of the housing, the surfaces of the housing in which the keyways are formed being opposite each other and transverse to the surfaces in which the slots are formed, wherein when the insert is pressed into the first opening of the housing a predetermined distance, the chamfered surfaces of keys of the flange cause the surfaces of the housing in which the keyways are formed to be deflected away from each other, the keys of the flange locking into the keyways when the insert has been pressed a predetermined distance into the first opening of the housing, the locking of the keys with the respective keyways locking the insert in a substantially fixed position with respect to the housing, and wherein the slots formed in the housing allow the surfaces of the housing in which the keyways are formed to be deflected away from each other.

4. The connector of claim 3, wherein the insert has a first cylindrical portion extending from the first end of the insert to a circumferential stop integrally formed on the exterior surface of the insert, a second cylindrical portion extending from the stop to the flange, and a third cylindrical portion extending from the flange to the second end of the insert, and wherein when the insert is locked into position within the housing by the interlocking of the keys of the flange with the keyways of the housing, the stop abuts the first opening in the housing, the stop being larger in size that the first opening such that the first opening prevents the stop from entering the housing.

5. The connector of claim 4, wherein the insert is comprised of a brass alloy.

6. The connector of claim 4, wherein the insert is comprised of a stainless steel.

7. The connector of claim 4, wherein the insert is comprised of a aluminum.

8. The optical connector of claim 1, wherein the insert has a substantially rectangular cross-section, and wherein when the insert is inserted into the first opening of the housing, the substantially square cross-section of the first opening of the housing aligns with the substantially rectangular cross-section of the insert to thereby cause the keying mechanism of the housing to align with the keying mechanism of the insert.

9. The connector of claim 1, wherein the ferrule assembly comprises:
   a barrel portion having a first end and a second end and an axial passageway formed therein, the second end of the barrel having a hexagonal cross-section;
   a ferrule having a first end and a second end, the first end of the ferrule being fixedly secured to the second end of the barrel, the ferrule having an axial passageway formed therein for receiving said end of the optical fiber, said end of the optical fiber passing through the axial passageway of the barrel and through the axial passageway of the ferrule such that said end of the optical fiber is disposed in the second end of the ferrule; and
   a flexible tube having a first end and a second end and an axial passageway formed therein, the second end of the tube being fixedly secured to the first end of the barrel, the optical fiber passing through the axial passageway of the tube.

10. The connector of claim 9, wherein the tube is comprised of fluorinated ethylene propylene.

11. The connector of claim 9, wherein the barrel is comprised of stainless steel, and wherein a buffer coating of an optical fiber cable comprising the optical fiber passing through the axial passageway of the ferrule assembly is adhesively attached to the barrel.

12. The connector of claim 9, further comprising:
   a spring having a generally cylindrical shape, the spring being disposed about the tube of the ferrule assembly when the ferrule assembly is securing within the housing, the spring having a first end and a second end, wherein when the insert engages the ferrule assembly, the second end of the insert is inserted over the first end of the tube and is placed in contact with the first end of the spring, and wherein when the insert is fixedly secured within the housing by the locking of the keying mechanisms, the spring is preloaded and the second end of the spring is in contact with the second end of the barrel, the second end of the barrel preventing the second end of the spring from coming into contact with the ferrule, and wherein when the second end of the barrel is pushed in a direction from the second opening in the housing toward the first opening in the housing such that the second end of the barrel is not seated in the recess of the housing, the second end of the barrel is rotatable to enable an eccentricity parameter associated with the ferrule assembly to be tuned.

13. The connector of claim 12, wherein the housing further comprises:
   an annular cylindrical portion having a first end and a second end, the first end of the annular cylindrical portion being adjacent the first opening of the housing; and
   a recess having a hexagonal cross-section adapted to receive the second end of the barrel of the ferrule assembly, wherein when the ferrule assembly is secured within the housing, the second end of the barrel having the hexagonal cross-section is seated within the recess having the hexagonal cross section.

14. The connector of claim 13, wherein the insert has a circumferential groove formed adjacent the first end for attachment of strength members of an optical fiber cable to the insert, the circumferential groove being located between the first end of the insert and the circumferential stop.

15. The connector of claim 1, wherein the housing further comprises:
   a manually operated latch adapted to secure the housing to an associated adapter to thereby prevent unintended decoupling of the housing from the adapter, the latch being positioned on a single side surface of the housing and movable in a direction that is perpendicular to the axial passageway of the ferrule assembly, the latch comprising a cantilever beam having a fixed end positioned toward the second opening of the housing and a free end extending in a direction away from the fixed end and away from the second opening.

16. The connector of claim 15, wherein the housing has a locking mechanism located adjacent the first end of the housing for attaching a yoke to the housing, the yoke comprising a trigger having a fixed end attached to the yoke and a free end extending in a direction away from the fixed end, the yoke having a locking mechanism thereon adapted to interlock with the locking mechanism of the housing, wherein when the yoke is attached to the housing, the free end of the trigger of the yoke is in proximity with the free end of the latch of the housing, and wherein when the trigger is depressed, the free end of the trigger exerts a downward force on the free end of the latch thereby causing the housing to be decoupled from the associated adapter.

17. The connector of claim 16, wherein the housing further comprises:
   a first stop disposed on the surface of the housing in which one of the keyways is located and a second stop disposed on the surface of the housing in which the other keyway is located, and wherein when the yoke is attached to the housing, the second end of the yoke abuts the first and second stops disposed on the housing.

18. The connector of claim 1, wherein the housing is comprised of polyphenylsulfone.

19. The connector of claim 18, wherein the housing is comprised of RADEL® R polyphenylsulfone.

20. The connector of claim 1, wherein the housing is approximately 20 mm. in length from the first opening of the housing to the second opening of the housing.

* * * * *